H. SCHROEDER AND S. J. KEMPIN.
POWER PULLEY ATTACHMENT FOR AUTOMOBILES.
APPLICATION FILED JUNE 9, 1919.

1,322,630.

Patented Nov. 25, 1919.

Inventors
S. J. KEMPIN
HENRY SCHROEDER

By A. E. Carlsen.
Attorney

UNITED STATES PATENT OFFICE.

HENRY SCHROEDER AND STANISLAUS J. KEMPIN, OF MINNEAPOLIS, MINNESOTA.

POWER-PULLEY ATTACHMENT FOR AUTOMOBILES.

1,322,630.  Specification of Letters Patent.  Patented Nov. 25, 1919.

Application filed June 9, 1919. Serial No. 302,968.

*To all whom it may concern:*

Be it known that we, HENRY SCHROEDER and STANISLAUS J. KEMPIN, citizens of the United States, residing at Minneapolis, in the county of Hennepin and State of Minnesota, have invented certain new and useful Improvements in Power-Pulley Attachments for Automobiles, of which the following is a specification.

Figure 1:
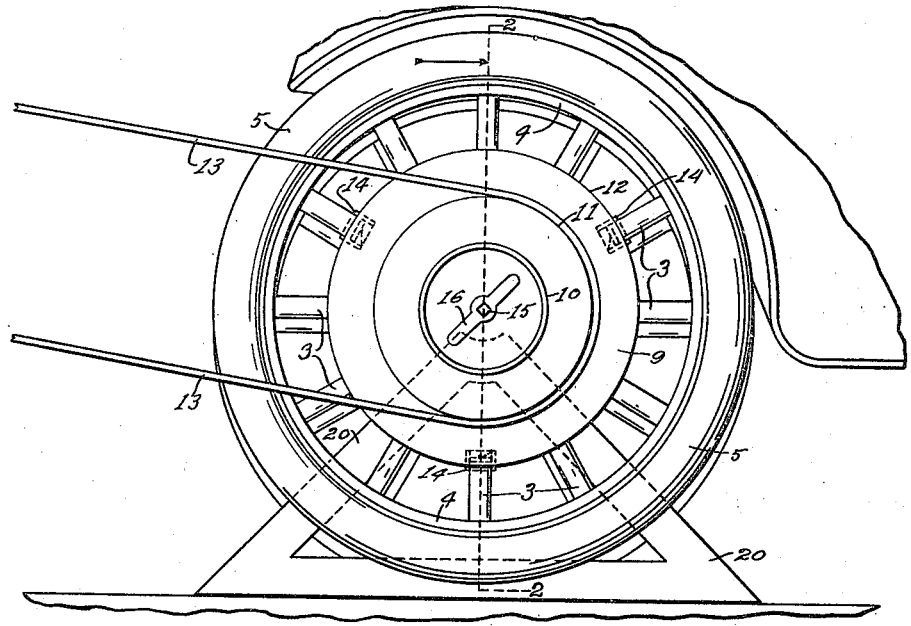
Figure 2:
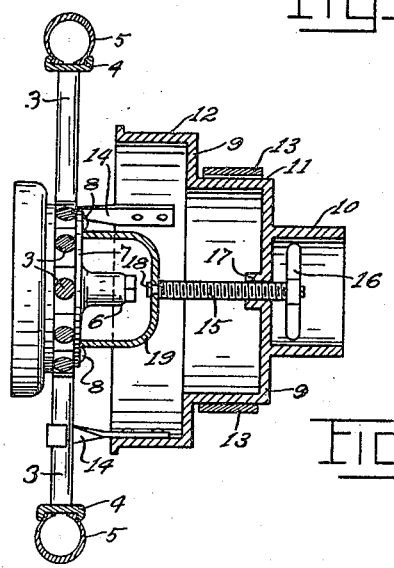

Our invention relates to power pulley attachments for automobiles and the object is to provide a simple yet efficient and convenient device for the purpose of furnishing power from an automobile to other machinery adapted to be driven by a belt. The construction of the device is clearly shown in the accompanying drawing in which:

Figure 1 is a side view of a rear portion of an automobile showing one of the ground drive wheels equipped with our pulley attachment. Fig. 2 is a substantially diametrical sectional view of the wheel and the attachment as shown on line 2—2 in Fig. 1.

Referring to the drawing by reference numerals, 3 designates the spokes of an automobile drive wheel having a rim 4, tire 5, hub 6, and a hub plate 7 secured to the wheel by bolts 8. The main body portion of our device consists of a belt cone 9 having a series of belt engaging pulley surfaces 10, 11, 12 of varying diameters for the purpose of transmitting power and speed of various degrees, an endless belt 13 being adapted to operatively connect said pulley surfaces with the pulley on the machine to be driven. Fixed upon the inner surface of the largest end of the cone 9 are three or more hooks 14 adapted to grip and pull against spokes of the wheel. A threaded bar 15, having a handle 16 secured thereto, is centrally mounted to rotate and screw in the cone member 9, at 17. The inner end of said bar 15 is snugly journaled at 18 in the central point of a cup 19 (shown in diametrical section in Fig. 2). Said cup 19 is preferably of a size that will bear against the hub plate 7 and just fit within the ring of bolts 8. Thus by first positioning the cup 19, when attaching the device, the belt cone 9 will automatically center itself upon the wheel. In attaching the cone it is necessary to screw the bar 15 back far enough to allow the hooks 14 sufficient action to be slipped over the spokes they are to engage. The cup is then forced forward against the plate 7 until the hooks 14 pull firmly against the spokes, thus tightly securing the cone to the wheel. While in operation it is necessary to raise the wheel slightly off of the ground by a jack or suitable support 20, as shown in Fig. 1. Having now clearly shown and fully described our invention what we claim to be new and desire to protect by Letters Patent is:

1. In combination with a ground drive wheel of a motor vehicle the same having a hub, spokes extending radially from said hub and a hub plate secured upon the outer side of said spokes, of a substantially hollow belt engaging cone, hooks fixed to said cone and adapted to engage some of said spokes, a cup centrally located within said cone and adapted to press against said hub plate, hand operated means for moving said cup toward and away from said cone.

2. In combination with a ground drive wheel of a motor vehicle, the same having a hub, spokes extending radially from said hub, a hub plate and bolts securing the same to the outer side of the wheel, of a substantially hollow belt engaging cone, hooks fixed to said cone and adapted to pull against some of said spokes, a cup concentrically located within said cone and adapted to guide within said bolts and press against said hub plate, a threaded bar journaled at one end centrally in said cup and adapted to screw centrally in said cone, means for turning said bar.

In testimony whereof we affix our signatures.

HENRY SCHROEDER.
STANISLAUS J. KEMPIN.